No. 669,868. Patented Mar. 12, 1901.
R. D. WEAKLEY.
TWINE HOLDER AND CUTTER.
(Application filed Aug. 2, 1900.)
(No Model.)
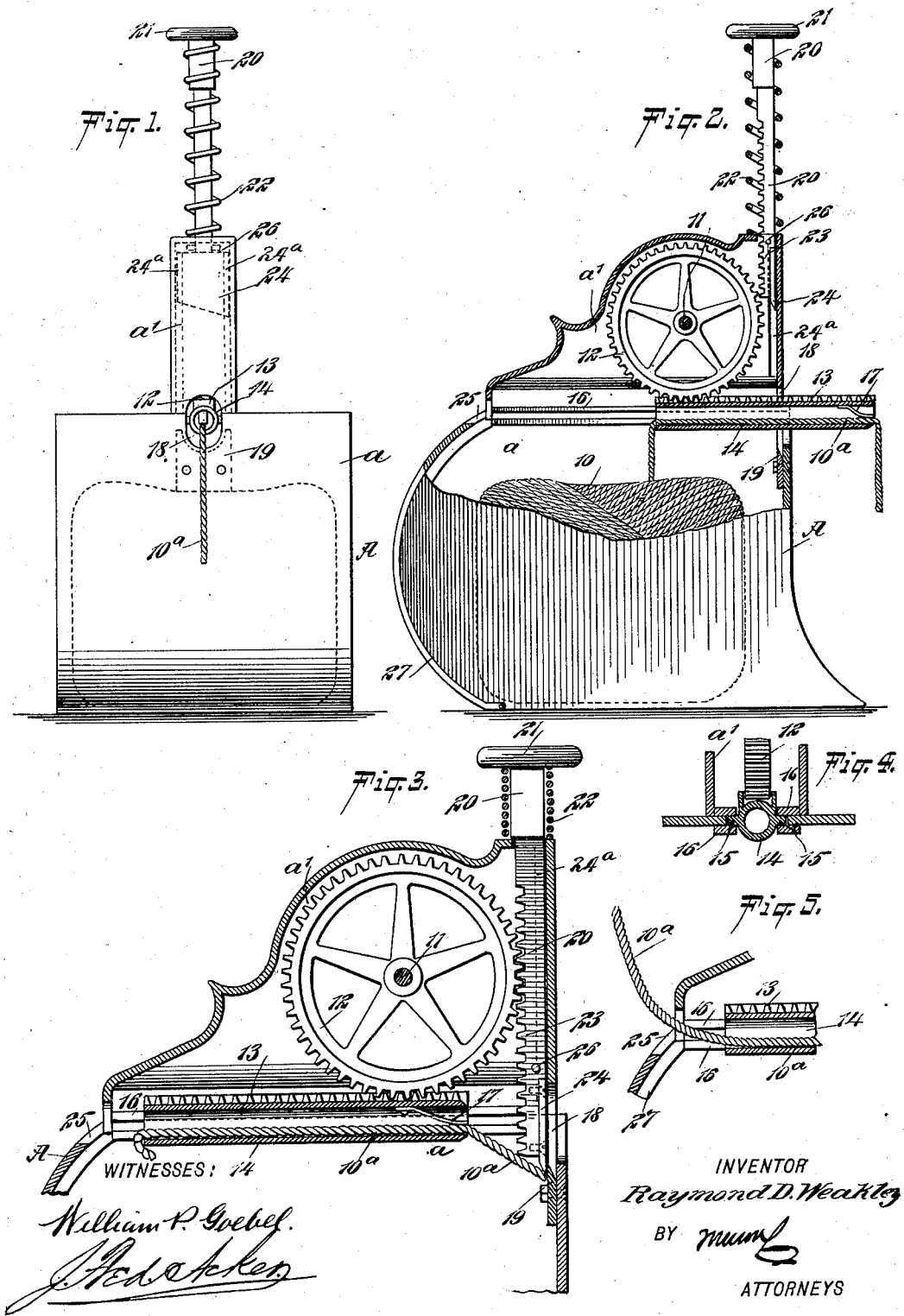
WITNESSES:
William P. Goebel.
INVENTOR
Raymond D. Weakley
BY Munn
ATTORNEYS
THE NORRIS PETERS CO., PHOTO-LITHO., WASHINGTON, D. C.

UNITED STATES PATENT OFFICE.

RAYMOND D. WEAKLEY, OF ST. LOUIS, MISSOURI.

TWINE HOLDER AND CUTTER.

SPECIFICATION forming part of Letters Patent No. 669,868, dated March 12, 1901.

Application filed August 2, 1900. Serial No. 25,662. (No model.)

*To all whom it may concern:*

Be it known that I, RAYMOND D. WEAKLEY, a citizen of the United States, and a resident of the city of St. Louis, in the State of Missouri, have invented certain new and useful Improvements in Twine Holders and Cutters, of which the following is a full, clear, and exact description.

One purpose of this invention is to provide a device especially adapted for guiding and for cutting twine and to so construct the device that the twine will be held in a suitable carrier and whereby cutting-blades may be brought into action at any time to sever the twine after the twine-carrier has been brought to a position within a casing, the movement of the twine-carrier within the casing being accomplished by the operation of the movable knife, since one of the knives or cutters is stationary and the other movable.

A further purpose of the invention is to so construct the device for operating the movable knife that after the twine has been cut and the movable knife is relieved from pressure the twine-carrier will be automatically carried or restored to its normal position, so that the twine may be utilized for tying another package.

Another purpose of the invention is to so construct the device that it will comprise but few parts readily operated and whereby a ball of twine may be placed in the device or may be supported outside of the device and guided through it.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the improved device. Fig. 2 is a partial side elevation and partial vertical section through the device, the parts being in their normal position. Fig. 3 is a vertical section through the improved device, the twine-carrier being in its inner position and the knives or cutting-blades being shown in action. Fig. 4 is a transverse section through the carrier for the twine and a partial front elevation of the toothed wheel which operates the twine-carrier; and Fig. 5 is a detail sectional view of a portion of the casing and a portion of the twine-carrier, illustrating the manner in which the twine when supported outside of the casing may be passed into the said carrier.

A represents a casing which is practically divided into two compartments, a lower compartment $a$ and an upper compartment $a'$, the upper compartment being centrally located with reference to the lower compartment and of less width, as shown in Fig. 1. Ordinarily a ball of twine 10 is placed in the lower compartment $a$, and the free end $10^a$ of the twine from the said ball is passed through a carrier 14, to be hereinafter described. In the upper compartment $a'$ a toothed wheel 12 is mounted to turn freely upon a suitable spindle 11, and the teeth of this wheel 12 are adapted to engage with teeth 13, located upon the upper surface of the carrier 14 heretofore referred to. This carrier 14 is in the form of a tube and is open at each of its ends. As shown in Fig. 4, the said carrier is provided with fins or ribs 15 at opposite sides, and these fins or ribs are adapted to enter slideways 16, located at the bottom portion of the upper section $a'$ of the casing A. The free end $10^a$ of that portion of the cord or twine which is passed through the sliding carrier 14 is held from slipping by placing a spring 17 in said carrier at its outlet end, as is particularly shown in Figs. 2 and 3, and the said carrier in its normal position extends through an opening 18 in the front of the casing A, so that the free end of the cord or twine may be readily grasped and the twine drawn from the ball until a sufficient quantity of twine has been freed for properly wrapping a package. The spring 17 effectually prevents the twine or cord from slipping back through the carrier, so that the end of the cord is always available for use.

Below the opening 18 a knife 19 is secured to the front portion of the casing A, and, as shown in Fig. 1, this knife is preferably provided with a concavity in its cutting edge, which is the upper edge of the knife.

In the upper portion of the upper section $a'$ of the casing A a plunger 20 is mounted to slide, and this plunger is provided with a suitable head 21 at its upper end. A spring 22 is coiled around the plunger, having bearing against its head and against the upper surface of the section a' of the casing A. The plunger 20 is provided at its inner longitudinal edge or surface with a series of teeth 23 in the form of a rack, and when the plunger is depressed these teeth are adapted to mesh with the teeth of the wheel 12 and revolve the same in such direction that the twine-carrier 14 will be made to travel within the casing to the position shown in Fig. 3, so that when the plunger 20 is depressed to its fullest extent, as shown in Fig. 3, a blade 24, attached to the lower portion of the said plunger, will pass the fixed blade 19 and sever that portion of the cord or twine which extends through the opening 18, as is also shown in Fig. 3. As soon as the plunger 20 is released from pressure the spring 22 acts and carries said plunger upward, thus reversing the movement of the wheel 12 and causing the said wheel to conduct the cord or twine carrier 14 to its outer or normal position. Suitable grooves 24ª are formed in the upper part of the casing to guide the upper knife and insure its proper registry with the lower knife.

When a ball of cord or twine is placed in a receptacle overhead or above the device, the free end of the cord is passed through an opening 25 at the rear of the casing A, which opening 25, as shown in Fig. 5, is so placed that the said free end of the cord may be conducted into and passed through the sliding cord or twine carrier 14.

In order that the knife or blade 24, attached to the plunger 20, shall not strike against the upper portion of the casing A when the plunger 20 ascends, a stop-pin 26 is passed through the plunger, which stop-pin engages with the casing, and thus saves the knife 24 from undue shock. A door 27 is preferably provided at the rear of the main section a of the casing A in order that a ball of twine or cord may be readily introduced.

Having thus described my invention, I claim as new and desire to secure by Letters Patent—

1. In a twine and string cutter, a casing, a tube mounted to slide in the said casing and out through a face thereof, the said tube being adapted to carry a strand of string or twine, a knife fixed below the tube, a plunger located above the tube, having movement to and from it, a knife carried by the plunger, and means for imparting forward and rearward movement to the twine-carrying tube by the movement of the said plunger, as described.

2. In a device for cutting twine and string, a casing, a tubular carrier for the string, provided with a retarding device, which tubular carrier has sliding movement in the casing, teeth located upon the tubular carrier, a wheel located within the casing, meshing with the said teeth, a spring-controlled plunger having a rack-surface adapted for engagement with the teeth of the said wheel, a cutting-blade located below the string-carrier, and a second blade carried by the plunger, as and for the purpose set forth.

3. In a device for holding and cutting twine and string, a casing, a tubular carrier having sliding movement in said casing, and adapted at one end to pass beyond an outer face of the said casing, a retaining device located in the said carrier, teeth formed upon the carrier, a blade secured to the casing below the carrier, a spring-controlled plunger having a rack-surface located in the casing above the carrier, a knife secured to the said plunger, adapted to coact with the fixed knife, and a toothed wheel located within the said casing, the teeth of which wheel are arranged to mesh with the teeth of the carrier and with the teeth of the plunger, for the purpose set forth.

4. In a twine or string holder and cutter, the combination, with a casing having a compartment to receive a ball of twine or cord, and an opening to receive an end of the twine supported outside of the casing, and a string or twine carrier, consisting of a tube mounted to slide in the said casing, which tube is provided at its delivery end with an internal retaining-spring and with external teeth, the said twine-carrier being arranged to pass through an opening in the face of the casing, of a blade fixed to the said casing at a point below the twine-carrier, a spring-controlled plunger mounted to slide in the upper portion of the casing to and from the said carrier, a cutting-blade carried by the lower portion of the said plunger, one side surface of the plunger being provided with a series of teeth, and a toothed wheel loosely mounted in the said casing, the teeth whereof are adapted for engagement with the teeth of the carrier and with the teeth of the plunger, for the purpose set forth.

In testimony whereof I have signed my name to this specification in the presence of two subscribing witnesses.

RAYMOND D. WEAKLEY.

Witnesses:
WILLIAM E. HENDERSON,
J. W. WEAKLEY.